United States Patent
Laing

[15] 3,637,986
[45] Jan. 25, 1972

[54] ELECTRICAL UNIT HAVING A MAGNETIC SWITCH CONNECTING A CORDLESS ELECTRIC POWER APPLIANCE TO A CHARGING APPLIANCE

[72] Inventor: Kikolaus Laing, Hofener Weg 35-37, 7141 Aldingen Bei Stuttgart, Germany

[22] Filed: Jan. 27, 1970

[21] Appl. No.: 6,269

[30] Foreign Application Priority Data

Feb. 3, 1969  Austria .............................. A 1070/69

[52] U.S. Cl. .......................... 219/519, 136/164, 219/520, 219/541, 335/205
[51] Int. Cl. ........................................................ H05b 1/02
[58] Field of Search ................ 219/541, 519, 520; 200/19 M; 335/205-206; 136/153, 164-165

[56] References Cited

UNITED STATES PATENTS

| 3,419,704 | 12/1968 | Hunt...................................219/268 |
| 3,448,365 | 6/1969 | Jacobson ..........................219/268 X |
| 2,568,474 | 9/1951 | Van Sciver........................335/205 X |
| 3,012,116 | 12/1961 | Boylan et al. ..........................335/205 |
| 3,068,333 | 12/1962 | Hewitt, Jr. ............................335/205 |
| 3,129,302 | 4/1964 | Postel ..................................335/206 |
| 3,251,960 | 5/1966 | Petterson..............................335/206 |

*Primary Examiner*—Volodymyr Y. Mayewsky
*Attorney*—Pennie, Edmonds, Morton, Taylor and Adams

[57] ABSTRACT

An electrical unit having a connecting means for a cordless electric power appliance whose terminals are brought into contact with the corresponding terminals of a charging appliance, having a magnetically operated electric switch whose switching mechanism has a magnetic arrangement on which a magnetic force closing the switch contacts is exerted by a further magnetic arrangement located in the electric appliance.

6 Claims, 7 Drawing Figures

PATENTED JAN 25 1972

3,637,986

PATENTED JAN 25 1972

ELECTRICAL UNIT HAVING A MAGNETIC SWITCH CONNECTING A CORDLESS ELECTRIC POWER APPLIANCE TO A CHARGING APPLIANCE

THE PRIOR ART

Domestic electric appliances are generally connected to the power supply by a connecting cable. This "cord connection" places a spacial limitation on the use of the electric appliance. Moreover, connections by means of a connecting cord are not free from danger and require periodic repair. Hence domestic electric appliances have been constructed in the form of "cordless" appliances which themselves contain the batteries required to drive them. In the case of electric heating appliances, such as for example flat irons, cordless operation is not practicable, since batteries which are capable of supplying the requisite power for such applicances do not, by reason of their weight and size, satisfy the other operating conditions. In the case of appliances for which short term operation without connection to the supply would be possible, such as for example warming plates for plates, cordless operation has not achieved any importance in the household since the repeated connection of the appliance to the power supply by means of a connecting cord for recharging is a cumbersome task.

It is also known to feed electrical energy into an electric appliance without the use of a connecting cord, by transmitting the electric alternating current by means of a transformer whose primary portion is arranged in a part of an appliance connected to the power supply and whose secondary portion is arranged in the electric appliance itself. As soon as the transformer portions are brought into interaction by accurate juxtaposition, power is fed into the consumer appliance without conductive connection. This arrangement suffers from the disadvantage that for large power requirement very heavy transformers are required and that moreover the two halves of the transformer have to be accurately disposed in order to avoid excessive leakage affecting the performance.

DESCRIPTION OF THE INVENTION

The invention relates to an electrical unit having a connecting means for a cordless electric power appliance whose terminals are brought into contact with the corresponding terminals of a charging appliance which can be connected to the power supply for charging.

The purpose of the invention is the provision of reliable and safe means for connecting an electric power appliance, as a rule a portable appliance, without a connecting cord to a charging appliance which can be connected to the power supply; this means that the electric appliance must be capable of connection to the charging appliance, even when it is relatively inaccurately lined up to it, without loss of energy and the corresponding terminals of the charging appliance must not be connected to the power supply unless the electric appliance to be charged makes it impossible for them to be touched.

The invention solves the problem in that a magnetically operated electric switch is provided in the leads to the corresponding terminals of the charging appliance whose switching mechanism has a first magnetic arrangement on which a magnetic force closing the switch contacts is exerted by a second magnetic arrangement located in the electric power consuming appliance, only when the terminals of the electric appliance practically touch the corresponding terminals of the charging appliance. By practically touching, a spacial relationship between the electric appliance and the charging appliance is established such that the electric power consuming appliance itself protects the corresponding terminals of the charging appliance from possible contact by hand. In general this will also be the case, apart from contact with the connecting terminals and the corresponding terminals, when these terminals are a very small distance apart.

The electric power consuming appliance is preferably provided with a permanent magnet arrangement whose poles have a quite definite, fixed, spacial relationship. The charging appliance is also provided with a permanent magnet arrangement whose poles are attached to the movable parts of the switch mechanism which is, for example, spring biased into a particular position. When the electric appliance approaches the charging appliance, the position of the magnet poles, and hence that of the movable parts of the switch mechanism is altered by mutual repulsion or attraction and the force which closes the switch contacts is created. These movable arranged permanent magnet poles may be arranged on pivotable levers, on a rotor or on a slide.

An essential characteristic of the invention consists in the fact that the combination of the magnetic arrangement in the electric appliance with the magnetic arrangement in the charging appliance forms a key for closure of the switch contacts. This combination must ensure that any external magnetic forces can not operate the switch mechanism and close the switch contacts.

The connecting means for transmitting power has proved particularly advantageous for electric appliances containing a heat store which is heated up by an electric heating resistor. Particularly suitable heat stores are masses which are capable of storing latent heat.

The invention is explained, by way of example, with reference to the illustrations.

In FIG. 1 the switch contacts of the power switch are shown open.

In the drawings the same reference numerals are used throughout for parts having the same manner of operation.

Figure 1:
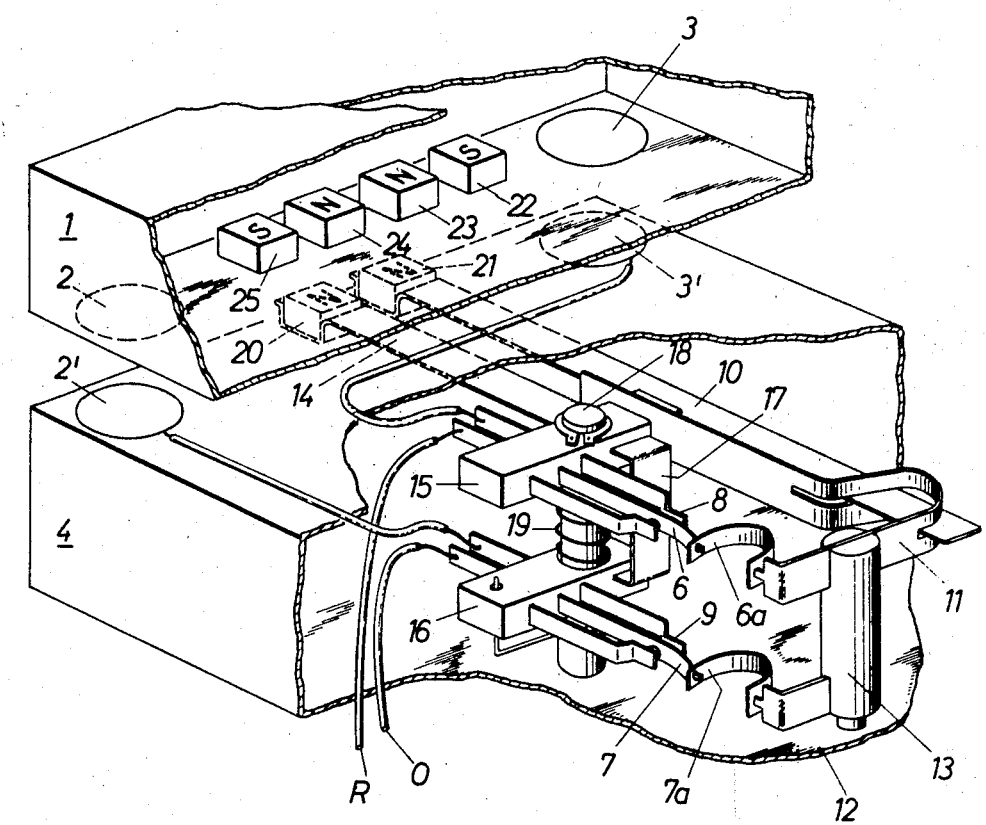
FIG. 1 is a perspective fragmentary view of power connecting means in accordance with the invention, and particularly the disposition of the magnetic arrangements in the charging appliance and the electric power consuming appliance.
Figure 2:
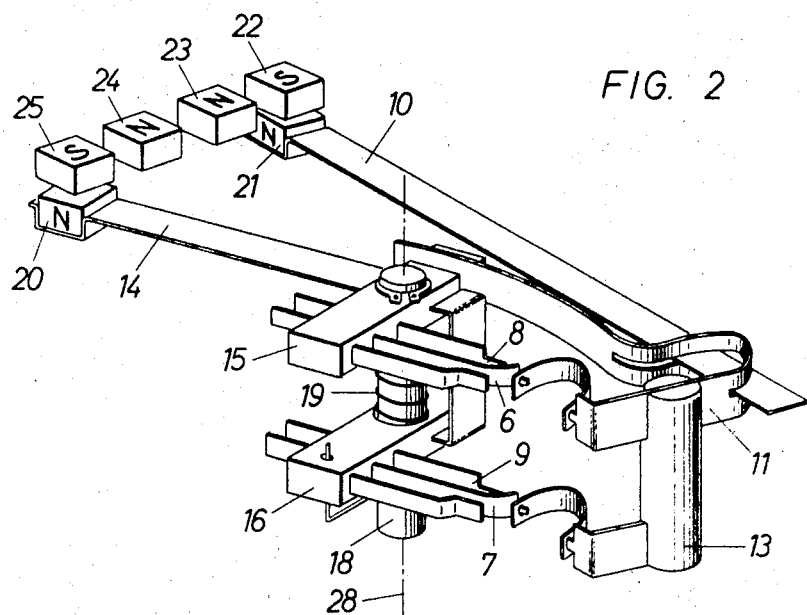
FIG. 2 is a plan view of the switch elements of the power switch as well as the magnetic arrangements in a position in which the switch contacts are closed.
Figure 2A:
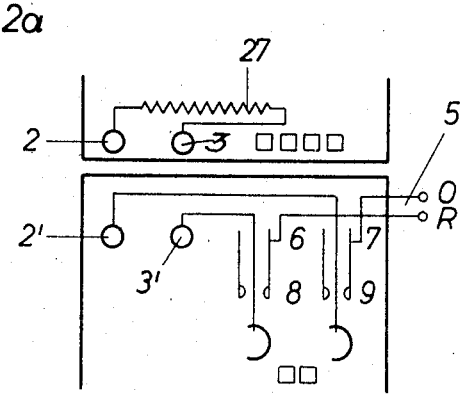
FIG. 2a shows a circuit diagram of the power connecting means of FIG. 1.

In the embodiments according to FIGS. 1, 2, and 2a the terminals 2 and 3 of the electric power consuming appliance 1 are brought into contact with the corresponding terminals 2' and 3' of the charging appliance 4 while the former is being charged up. At the same time the switch contacts 6 and 8 on the one hand, as well as 7 and 9 on the other, are closed, so that the corresponding terminals 2' and 3' and the terminals 2 and 3 are connected to the supply O-R.

The electric appliance 1 is provided with permanent magnets 22, 23, 24 and 25, of which the two middle ones 23 and 24 have their north poles and the two outer ones 22 and 25 their south poles pointing downwards. In the charging appliance 4 two permanent magnets with their north poles pointing upwards are attached to levers 10 and 14. The lever 10 is connected to a peg 13 via a leaf spring 11, the peg 13 being freely displaceable in the housing 4. The leaf spring in turn is firmly connected to the baseplate 15 and determines the pressure on the switch contacts 6, 7 via the tensioning springs 6a, 7a. The lever 14 is connected to the two baseplates 15 and 16 of the switch which carry the switch contacts, via the strap 17. These baseplates are pivotally mounted on a pin 18 which is firmly connected to the base 12 of the housing and are pretensioned by a spring 19 in a clockwise direction as seen in the drawings.

When the electric appliance 1 with its poles 22, 23, 24 and 25 approaches the charging appliance 4, the north poles 23 and 24 repel the north poles 20 and 21, while the last-mentioned north poles are attracted by the south poles 22 and 25 so that the two levers 10 and 14 are splayed apart in the position shown in FIG. 2. Thereby the switch contacts 6 and 8 on the one hand, as well as 7 and 9 on the other, are closed and thereby the connection of the terminals 2 and 3 is made to the supply. The action of the magnetic force effects closure of these switch contacts only when the electric appliance 1 has been brought so close to the charging appliance that it is impossible to touch the corresponding terminals 2' and 3' by hand. By connecting the terminals 2 and 3 to the supply, the resistor 27 is supplied with current and thereby heats up the electric appliance.

The disposition of the poles of the permanent magnet arrangement cannot be substituted by other magnetic dispositions and therefore constitutes a key. Even the application of mechanical forces to the charging appliance from, for example, the left or right, do not enable the switch contacts to close, since both magnets 20 and 21 would be pivoted in the same direction, without the switch being able to close as a result. Neither would the magnets 20 and 21 perform a splaying movement in the event of a knock from below or from above or in the case of an angular acceleration about any axis parallel to the axis rotation 28. The switch contacts are closed when, and only when, the electric appliance 1 touches the charging appliance 4 or nearly touches it and the terminals 2 and 3 are reasonably accurately aligned with the corresponding terminals 2' and 3'. Thus the essential feature of this embodiment of the invention resides in the fact that by the interaction of the magnetic arrangements in the two appliances two levers are relatively splayed and mechanical closure of the switch contacts is possible only due to this splaying.

Figure 3:
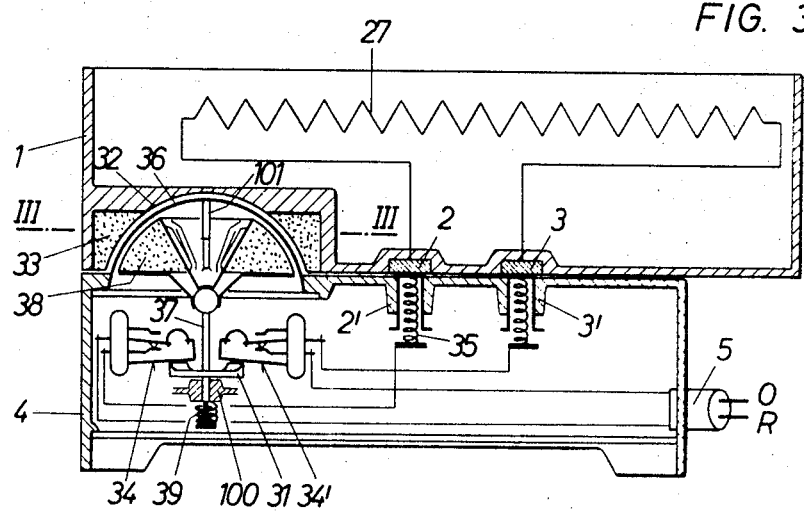
FIG. 3 shows a diagrammatic section of a power connecting means in accordance with the invention with a rotary switch.
Figure 3B:
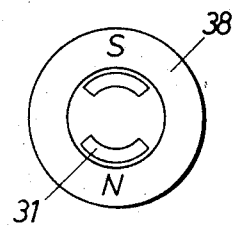
FIGS. 3a and 3b are sectional views on the line III—III in FIG. 3 of the switch in different positions.
Figure 3A:
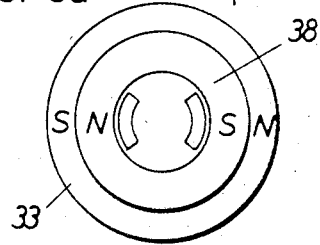

FIG. 3 shows an embodiment of the invention in which the switch contacts are closed by a mechanical rotary switch which is operated magnetically. The electric appliance 1 has a hemispherical recess 32, as well as a ring magnet 33, polarized in the manner shown in FIG. 3a. The charging appliance has a hemispherical bulge 36 which fits into the recess 32 and in which a ring magnet 38 mounted on a shaft 37 is provided. The shaft 37 is supported in bearings 100 and 101. A cam disc 31 is attached to the lower end of the shaft 37. When the electric appliance sits on the charging appliance 4, so that the terminals touch the corresponding terminals 2' and 3', the ring magnet 38 in the charging appliance assumes the position shown in FIGS. 3 and 3a opposite the ring magnet 33 in the electric appliance, and the cam disc 31 causes the contact springs 34 and 34' to be pressed upwards and connection to be made between the corresponding terminals 2' and 3' and the supply O–R. Rotation of the ring magnet 38 into the position shown in FIGS. 3 and 3a takes place against the bias of the spring 39. When the electric appliance 1 is lifted off the charging appliance, the spring 39 pivots the cam disc 31 through 90°, as shown in FIG. 3b, whereby the contact springs 34 and 34' reassert themselves downwards, so that the switch is opened.

Figure 4:
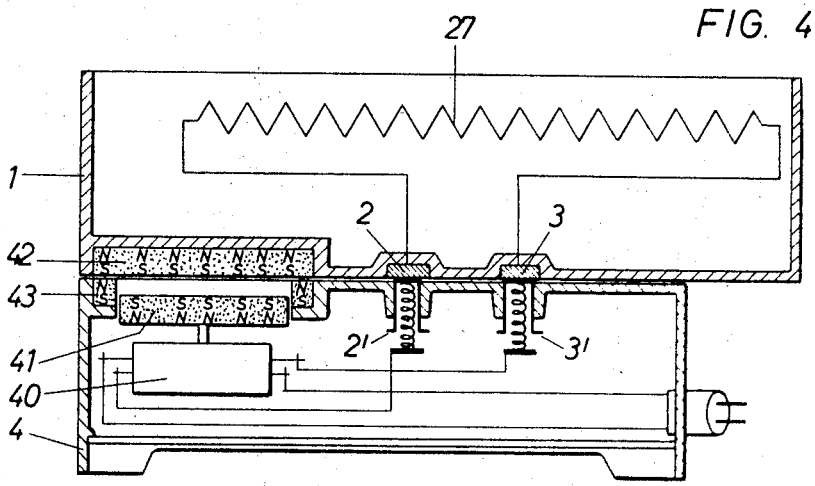
FIG. 4 shows a diagrammatic sectional view of a power connecting means in accordance with the invention with a push switch.

In FIG. 4 an embodiment of the invention is shown in which a push switch is provided which is only shown diagrammatically in this figure This push switch has the usual contacts. The push switch 40 is actuated via an axially magnetized plate 41, which is pushed into the switching-on position shown, when the electric appliance 1 with an oppositely axially magnetized plate 42 is seated on the charging appliance 4. In the embodiment shown the south poles of the magnetized plates face each other and exert a repulsive effect by which the push switch is actuated. When the electric appliance 1 is removed, the plate 41 moves upwards into the plane of the ring magnet 43 which is also axially magnetized with its north pole facing upward and its south pole downward, whereby the double-pole switch 40 is interrupted.

I claim:
1. An electrical unit comprising:
   a. a charging appliance adapted to be connected to an electrical power source, said charging appliance having:
      i. a charging casing for said charging appliance,
      ii. a first set of terminals on the outer surface of said charging casing,
      iii. a first electrical circuit element in said charging appliance for connecting said first set of terminals to said power source, and,
      iv. a magnetic switch in said first electrical circuit element having a first magnetic arrangement thereon for breaking or completing said first electrical circuit element, and
   b. a moveable power consumer appliance having:
      i. a consumer casing for said power consumer appliance,
      ii. a second set of terminals on the outer surface of said consumer casing adapted to engage with said first set of terminals on said charging casing,
      iii. a second electrical circuit element in said consumer appliance connecting with said second set of terminals, and
      iv. a second magnetic arrangement in said consumer appliance for acting magnetically with said first magnetic arrangement whereby when said second set of terminals are brought close to said first set of terminals, the magnetic forces between said first and second magnetic arrangements will cause said magnetic switch to close to complete said first circuit element and when sand first and second sets of terminals are brought into contact with each other, to complete and electrical circuit.

2. An electrical unit according to claim 1 wherein the second magnetic arrangement is a permanent magnet arrangement with fixed north and south poles and wherein the first magnetic arrangement is a permanent magnet arrangement with movable magnetic north and south poles attached to mechanical switch elements of said magnetic switch with the relative disposition of the poles of the two magnetic arrangements arranged such that when the first and second set of terminals are brought close together, the poles on the switch elements are subjected to magnetic forces by the poles in the first magnetic arrangement whereby the switch elements are moved to close said magnetic switch.

3. An electrical unit according to claim 2 whereby the switch elements comprise two levers each pivotally supported at one end and having a permanent magnet on the other end, switch contacts adapted to be closed when said levers are splayed, and spring means for urging said levers to pivot in a direction to open said switch contacts; the poles of the magnets on said levers being repelled by the poles of the magnets of said second magnetic arrangement when said first and second terminals are moved close together.

4. An electrical unit according to claim 2, characterized in that the magnetic switch is a rotary switch and in that the two magnetic arrangements are ring magnets having a polarity such that these ring magnets are constrained to adopt a definite position when they approach each other, the switch being switched on in this position, and in that a spring is provided, which biases the ring magnet which is connected to the switch, into a position displaced by 90° from the said constrained position.

5. An electrical unit according to claim 2, characterized in that the magnetic switch is a push switch and in that the two magnetic arrangements are provided with permanent magnets which repel or attract each other against a spring bias.

6. An electrical unit according to claim 5, characterized in that the two magnetic arrangements are in the form of permanent magnets such that the opposing surfaces are magnetized as north and south poles over a region such that poles of the same polarity are disposed opposite each other and thereby exert a repulsive force on each other which actuates the push switch and thereby connects the corresponding terminals to the supply only when the electric appliance is in the correct operational position.

* * * * *